(12) United States Patent
Korus et al.

(10) Patent No.: US 8,757,302 B2
(45) Date of Patent: Jun. 24, 2014

(54) IRRIGATION SYSTEM TRACK ASSEMBLY WITH ADJUSTABLE TOW

(71) Applicant: Lindsay Corporation, Lindsay, NE (US)

(72) Inventors: Thomas J. Korus, Lindsay, NE (US); Jochen Pfrenger, The Woodlands, TX (US)

(73) Assignee: Lindsay Corporation, Lindsay, NE (US)

( * ) Notice: Subject to any disclaimer, the term of this patent is extended or adjusted under 35 U.S.C. 154(b) by 0 days.

(21) Appl. No.: 13/939,084

(22) Filed: Jul. 10, 2013

(65) Prior Publication Data

US 2013/0292194 A1  Nov. 7, 2013

Related U.S. Application Data

(62) Division of application No. 13/211,952, filed on Aug. 17, 2011.

(51) Int. Cl.
*B05B 3/18* (2006.01)
*B62D 55/00* (2006.01)

(52) U.S. Cl.
USPC ......... 180/9.1; 180/9.21; 180/9.36; 180/9.44; 239/723; 239/728; 239/735; 239/744

(58) Field of Classification Search
USPC ............... 180/9.1, 9.21, 9.23, 9.36, 9.44; 239/722, 723, 724, 726, 727, 728, 732, 239/735, 737, 743, 744, 748; 305/153, 165
See application file for complete search history.

(56) References Cited

U.S. PATENT DOCUMENTS

| | | | | | |
|---|---|---|---|---|---|
| 3,608,826 | A | * | 9/1971 | Reinke | 239/729 |
| 3,628,729 | A | * | 12/1971 | Thomas | 239/729 |
| 3,712,544 | A | * | 1/1973 | Ririe et al. | 239/731 |
| 3,720,374 | A | * | 3/1973 | Ross | 239/731 |
| 4,074,783 | A | * | 2/1978 | Arndt et al. | 239/731 |
| 4,442,974 | A | * | 4/1984 | Noble | 239/1 |
| 4,501,392 | A | * | 2/1985 | Hait | 239/728 |
| 4,763,836 | A | * | 8/1988 | Lyle et al. | 239/69 |
| 4,832,263 | A | * | 5/1989 | Poynor | 239/197 |
| 4,961,531 | A | * | 10/1990 | Nel | 239/1 |
| 5,078,326 | A | * | 1/1992 | Wright | 239/737 |
| 6,131,833 | A | * | 10/2000 | Chapman | 239/728 |
| 6,755,362 | B2 | * | 6/2004 | Krieger et al. | 239/731 |
| 6,755,363 | B2 | * | 6/2004 | Weatherl et al. | 239/735 |
| 6,805,311 | B2 | * | 10/2004 | Buller | 239/722 |
| 7,229,032 | B1 | * | 6/2007 | Christensen et al. | 239/744 |
| 7,419,107 | B1 | * | 9/2008 | Theilen | 239/741 |
| 2002/0179343 | A1 | * | 12/2002 | Theilen | 180/9.21 |
| 2009/0166451 | A1 | * | 7/2009 | Parod et al. | 239/723 |
| 2010/0032495 | A1 | * | 2/2010 | Abts | 239/69 |
| 2010/0127103 | A1 | * | 5/2010 | Toman | 239/726 |
| 2010/0288846 | A1 | * | 11/2010 | Nelson et al. | 239/1 |
| 2011/0121111 | A1 | * | 5/2011 | Parod et al. | 239/735 |
| 2011/0127344 | A1 | * | 6/2011 | Korus et al. | 239/1 |

* cited by examiner

*Primary Examiner* — Joseph M Rocca
*Assistant Examiner* — Marc A Scharich
(74) *Attorney, Agent, or Firm* — Hovey Williams LLP

(57) ABSTRACT

A track assembly for a mobile tower of an irrigation system includes a mounting bracket; a gearbox assembly and a rotatable drive wheel hub attached to the mounting bracket; a drive wheel attached to the drive wheel hub; a rotatable tension wheel hub attached to the mounting bracket and spaced from the drive wheel hub; a tension wheel attached to the tension wheel hub; a track belt trained over the drive wheel and the tension wheel and driven by the drive wheel to propel the mobile tower; and structure for pivotally mounting the mounting bracket to the mobile tower.

11 Claims, 5 Drawing Sheets

IRRIGATION SYSTEM TRACK ASSEMBLY WITH ADJUSTABLE TOW

RELATED APPLICATION

The present application is a divisional application of co-pending U.S. patent application titled IRRIGATION SYSTEM TRACK ASSEMBLY WITH ADJUSTABLE TOW, Ser. No. 13/211,952, filed Aug. 17, 2011 which is hereby incorporated by reference in its entirety into the present application.

BACKGROUND OF THE INVENTION

1. Field of the Invention

The present invention relates to agricultural irrigation systems. More particularly, the invention relates to an improved track assembly for an irrigation system.

2. Background

Agricultural irrigation systems such as central pivot irrigation machines and lateral move irrigation machines are commonly used to irrigate crops. A central pivot irrigation machine typically includes, among other things, a central pivot communicating with a pressurized water supply and a series of spans formed from mobile support towers connected to the central pivot and to one another by truss-type framework sections. A water distribution conduit is supported by the framework sections and a number of sprinkler heads, spray guns, drop nozzles, or other fluid-emitting devices are spaced along the length of the conduit. A lateral move irrigation system is similar except it does not include a central pivot but instead has several aligned spans that move laterally across a rectangular-shaped field.

The mobile towers of central pivot and lateral move irrigation systems are typically supported on wheel and tire assemblies that are driven by suitable motors. These wheel and tire assemblies sometimes slip, get stuck, and/or create ruts, especially in wet low-lying areas or on hills.

To alleviate these problems, a mobile tower's tires can be replaced with track assemblies similar to those installed on earth-movers and tractors. Track assemblies provide better traction and have a much larger footprint and better ground "floatation" and therefore don't create ruts and damage crops as much as tires do.

Unfortunately, known irrigation system track assemblies are complex and expensive and are therefore not practical for many applications. Moreover, known track assemblies sometimes provide too much traction and are therefore difficult to guide in a circular or other non-straight path without creating excessive stress on the irrigation system. In fact, applicant has discovered that known track assemblies can cause the spans of smaller irrigation systems to buckle while turning. Similarly, applicant has discovered that known track assemblies create excess off-set loading on gearbox output shafts and other irrigation system components.

To allow an irrigation system to more easily follow a circular or other non-linear path, its wheels or track assemblies can be provided with a selected steering angle or tow. Unfortunately it is difficult and time-consuming to set the tow on existing irrigation system track assemblies.

SUMMARY

The present invention solves the above described problems and provides an improved track assembly for irrigation systems that doesn't suffer from the above-described problems and/or other problems. More particularly, the present invention provides a track assembly with better traction and flotation than wheel and tire assemblies, but that does not create the buckling and off-set loading problems of existing irrigation system track assemblies. The track assembly of the present invention is also less complex and costly than known irrigation system track assemblies and is therefore practical for use with nearly any irrigation system. The tow or steering angle of the track assembly can also be more quickly and easily set and adjusted.

An embodiment of the track assembly is configured for replacing at least one wheel on an irrigation system mobile tower and broadly comprises a mounting bracket; a gearbox assembly and rotatable drive wheel hub attached to the mounting bracket; a drive wheel attached to the drive hub; a rotatable tension wheel hub attached to the mounting bracket and spaced from the drive hub; a tension wheel attached to the tension wheel hub; and a track belt trained over the drive wheel and the tension wheel and driven by the drive wheel to propel the mobile tower.

In accordance with one important aspect of the invention, the track assembly also includes structure for pivotally mounting the mounting bracket to the mobile tower to permit the drive hub and attached drive wheel to turn slightly to more easily follow a curved path. In one embodiment, the structure includes a hinge plate attached to the mobile tower and a locking pin for pivotally coupling the mounting bracket to the hinge plate. The structure may also include an eyelet or turnbuckle to adjust the pivot angle of the mounting bracket relative to the hinge plate to achieve a preselected steering angle or tow.

The track assembly may further include structure for adjusting a mounting angle of the gearbox on the mounting bracket to further adjust the steering angle or tow of the track assembly. In one embodiment, the structure includes a shim or similar device for placement between the track assembly's gearbox and mounting bracket. This allows the tow or steering angle of each track assembly to be selectively adjusted to accommodate its particular mobile tower. For example, the tow of all the track assemblies of an irrigation system may be set during initial system set-up and installation. The tow of some of the track assemblies may then be modified in the field with the hinge plate, mounting bracket, and turnbuckle described above. Then, the tow of selected ones of the track assembly's may be adjusted even further with one or more of the shims.

This summary is provided to introduce a selection of concepts in a simplified form that are further described in the detailed description below. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures. For example, the principles of the present invention are not limited to central pivot irrigation systems, but may be implemented in other types of irrigation systems including linear move irrigation systems.

BRIEF DESCRIPTION OF THE DRAWING FIGURES

Embodiments of the present invention are described in detail below with reference to the attached drawing figures, wherein.

Figure 1:
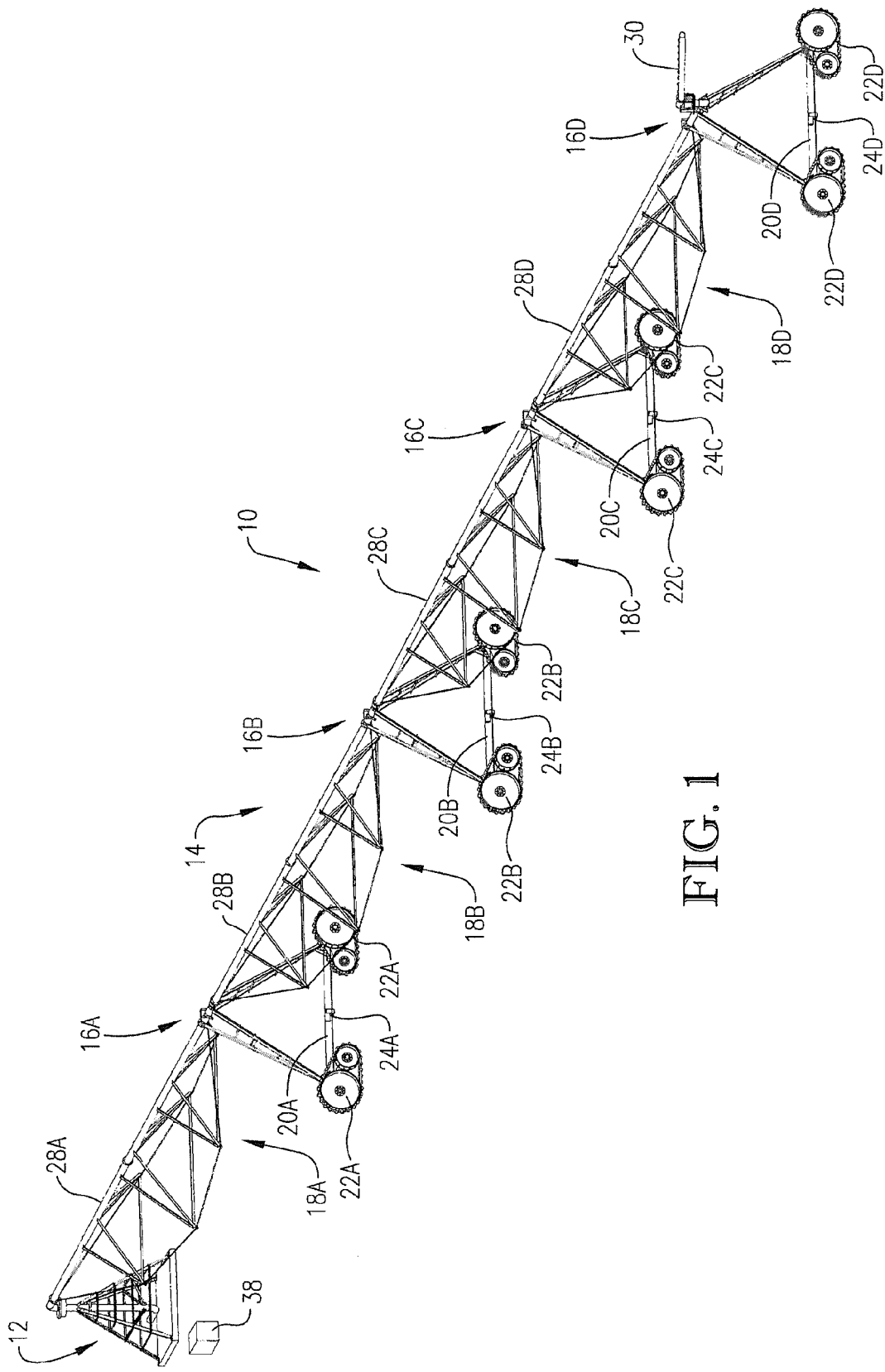
FIG. 1 is a perspective view of an exemplary central pivot irrigation system on which the track assembly of the present invention may be implemented.

The drawing figures do not limit the present invention to the specific embodiments disclosed and described herein. The drawings are not necessarily to scale, emphasis instead being placed upon clearly illustrating the principles of the invention.

DETAILED DESCRIPTION

The following detailed description of embodiments of the invention references the accompanying drawings. The embodiments are intended to describe aspects of the invention in sufficient detail to enable those skilled in the art to practice the invention. Other embodiments can be utilized and changes can be made without departing from the scope of the claims. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

Turning now to the drawing figures, and initially FIG. 1, an exemplary irrigation system 10 on which principles of the present invention may be implemented is illustrated. The illustrated irrigation system 10 is a central pivot irrigation system that broadly comprises a fixed central pivot 12 and a main section 14 pivotally connected to the central pivot. The irrigation system 10 may also comprise an extension arm (also commonly referred to as a "swing arm" or "corner arm") pivotally connected to the free end of the main section.

The fixed central pivot 12 may be a tower or any other support structure about which the main section 14 may pivot. The central pivot has access to a well, water tank, or other source of water and may also be coupled with a tank or other source of agricultural products to inject fertilizers, pesticides and/or other chemicals into the water for application during irrigation.

The main section 14 may comprise a number of mobile support towers 16A-D, the outermost 16D of which is referred to herein as an "end tower". The support towers are connected to the fixed central pivot 12 and to one another by truss sections 18A-D or other supports to form a number of interconnected spans. The irrigation system 10 illustrated in FIG. 1 has four mobile support towers 16A-D; however, it may comprise any number of mobile support towers without departing from the scope of the present invention.

Each mobile tower may include a drive tube 20A-D on which a pair of track assemblies 22A-D is mounted. Embodiments of the track assemblies 22A-D are described in more detail below. A drive motor 24A-D and drive shaft 26A-D are mounted to the drive tube for driving at least one of the track assemblies. The motors 24A-D may include integral or external relays so they may be turned on, off, and reversed. The motors may also have several speeds or be equipped with variable speed drives. Instead of track assemblies, some of the mobile towers 16A-D may have wheels driven by drive motors.

As is well known, the drive motors are controlled by a suitable safety system such that they may be slowed or completely shut down in the event of the detection of an adverse circumstance, all of which is disclosed, for example, in U.S. Pat. No. 6,042,031 to Christensen, et al. incorporated herein by reference in its entirety.

Each of the truss sections 18A-D carries or otherwise supports a conduit section 28A-D or other fluid distribution mechanism that is connected in fluid communication with all other conduit sections. A plurality of sprinkler heads, spray guns, drop nozzles, or other fluid-emitting devices are spaced along the conduit sections 28A-D to apply water and/or other fluids to land underneath the irrigation system.

The irrigation system 10 may also include an optional extension arm (not shown) pivotally connected to the end tower 16D and supported by a swing tower with steerable wheels driven by a motor. The extension arm may be joined to the end tower by an articulating pivot joint. The extension arm is folded in relative to the end tower when it is not irrigating a corner of a field and may be pivoted outwardly away from the end tower while irrigating the corners of a field.

The irrigation system 10 may also include one or more high pressure sprayers or end guns 30 mounted to the end tower 16D or to the end of the extension arm. The end guns are activated at the corners of a field or other designated areas to increase the amount of land that can be irrigated.

The irrigation system 10 may also include a main control system for controlling movement of the mobile towers 16A-D and operation of the fluid-emitting devices in accordance with an irrigation design program. The main control system may include a processor or other computing device with inputs that receive positional information from one or more GPS receivers mounted to the end tower or elsewhere. The processor may alternatively receive position information from angle encoders mounted between the central pivot and a first span of the main section. The processor may also include outputs connected to relay-controlled valves connected to the water-emitting devices and relay-controlled electric motors connected to the drive wheels of the mobile towers.

Figure 2:
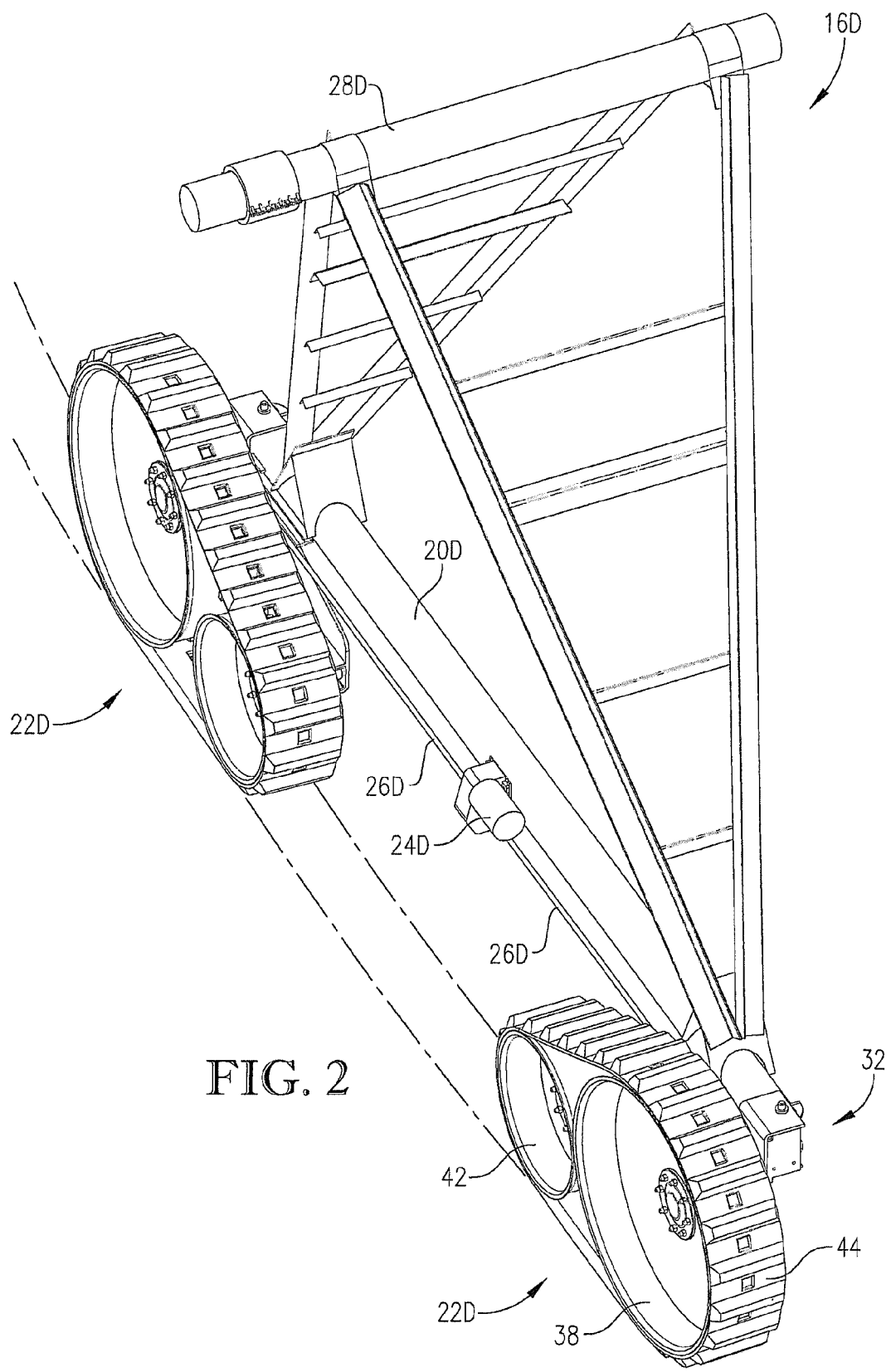
FIG. 2 is a perspective view of one of the mobile towers of the irrigation system shown with two track assemblies installed thereon.
Figure 3:
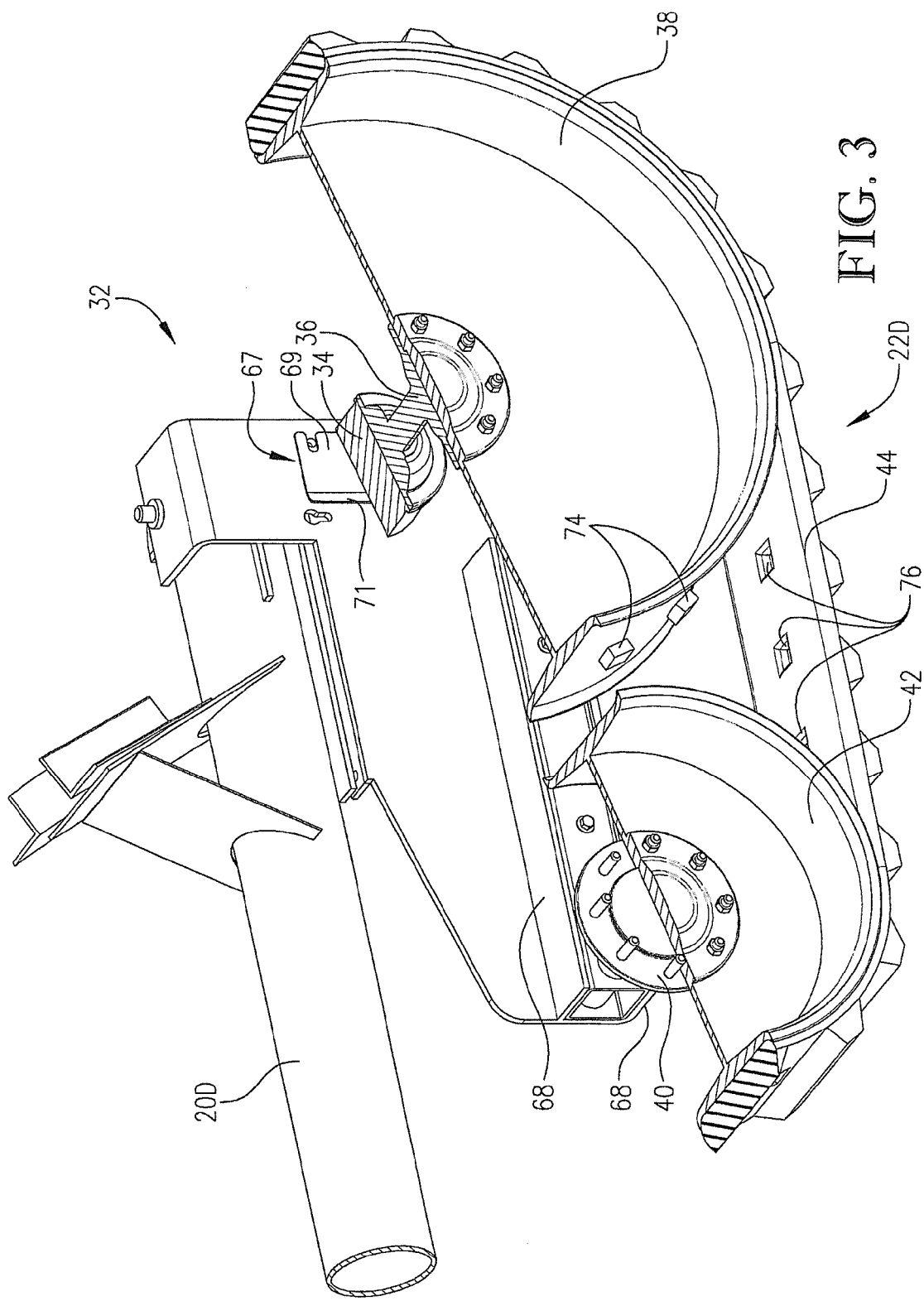
FIG. 3 is an enlarged perspective view in partial section of one of the track assemblies shown mounted to a drive tube of a mobile tower.
Figure 4:
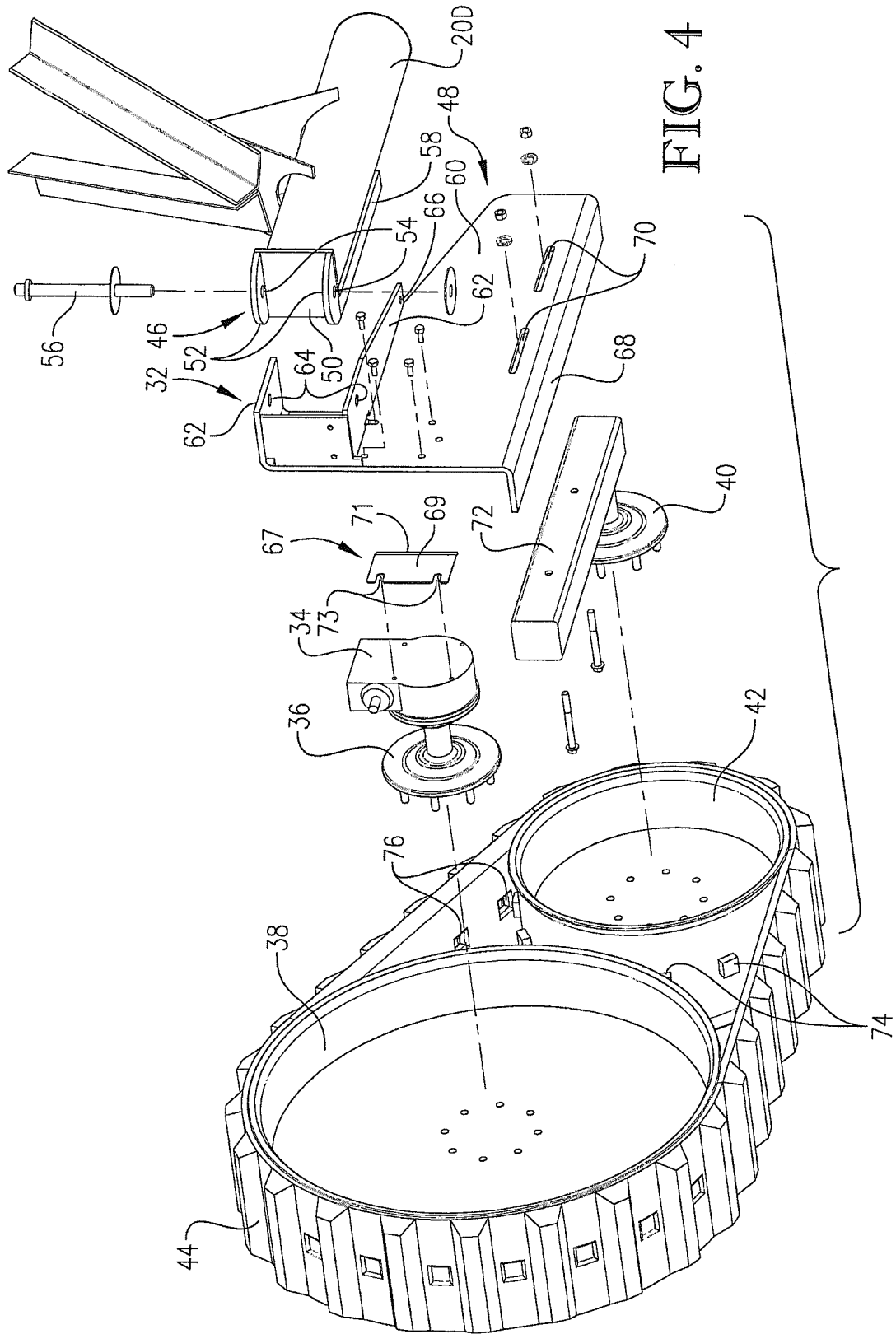
FIG. 4 is an exploded perspective view of one of the mobile towers and one of its track assemblies.

Turning now to FIGS. 2-4, embodiments of the track assemblies 22A-D will now be described in more detail. As shown, a mobile tower 16D may include a pair of track assemblies, each of which broadly comprises a mounting assembly 32; a gearbox assembly 34 and rotatable drive wheel hub 36; a drive wheel 38; a rotatable tension wheel hub 40; a tension wheel 42; and a track belt 44. All of the track assemblies 22A-D are essentially identical; therefore only one track assembly 22D will be described in detail in this application.

As best shown in FIGS. 3 and 4, the mounting assembly 32 is attached to one end of the drive tube 20D and is provided for supporting the other components of the track assembly to the mobile tower. An embodiment of the mounting assembly 32 includes a hinge plate 46 connected to the drive tube and a mounting bracket 48 pivotally connected to the hinge plate by a locking pin 56. The hinge plate 46, mounting bracket 48, and locking pin 56 together provide structure for pivotally mounting the mounting bracket 48 to the mobile tower to permit the drive hub 36, drive wheel 38 to turn slightly with a desired steering angle or tow.

The hinge plate 46 includes a vertically extending plate 50 welded or otherwise fastened to one end of the drive tube 20D and a pair of spaced-apart, horizontally extending flanges 52 extending from the vertical plate. Vertically aligned pin holes 54 extend through the flanges for receiving a locking pin 56 as described below. The hinge plate 46 also includes a rearwardly extending horizontal leg 58 that is positioned below the drive tube. A bolt hole may be positioned in the leg and aligned with a bolt hole on the mounting bracket as described below.

The mounting bracket 48 includes a vertically-extending plate 60 and a pair of spaced-apart horizontally-extending flanges 62 extending from the vertical plate. Vertically aligned pin holes 64 extend through the flanges. The mounting bracket 48 may be attached to the hinge plate 46 by placing the mounting bracket flanges 62 over the hinge plate flanges 52 so as to align the holes 54 and 64, and then placing the locking pin 56 through the holes 54 and 64. This arrangement permits the mounting bracket 48 to pivot relative to the hinge plate 46 and the drive tube 20D so the track assembly 22D may turn slightly to follow a curved path. A threaded eyelet or turnbuckle may attach the mounting bracket to the drive tube or to the hinge plate. The pivot angle of the mounting bracket may then be selected by adjusting the eyelet or turnbuckle to achieve a pre-selected turning radius or tow. Alternatively, a bolt may be positioned through a hole 66 in the mounting bracket flange and into a slot in the hinge plate leg to adjust the pivot angle of the bracket and the tow of the track assembly.

Figure 5:
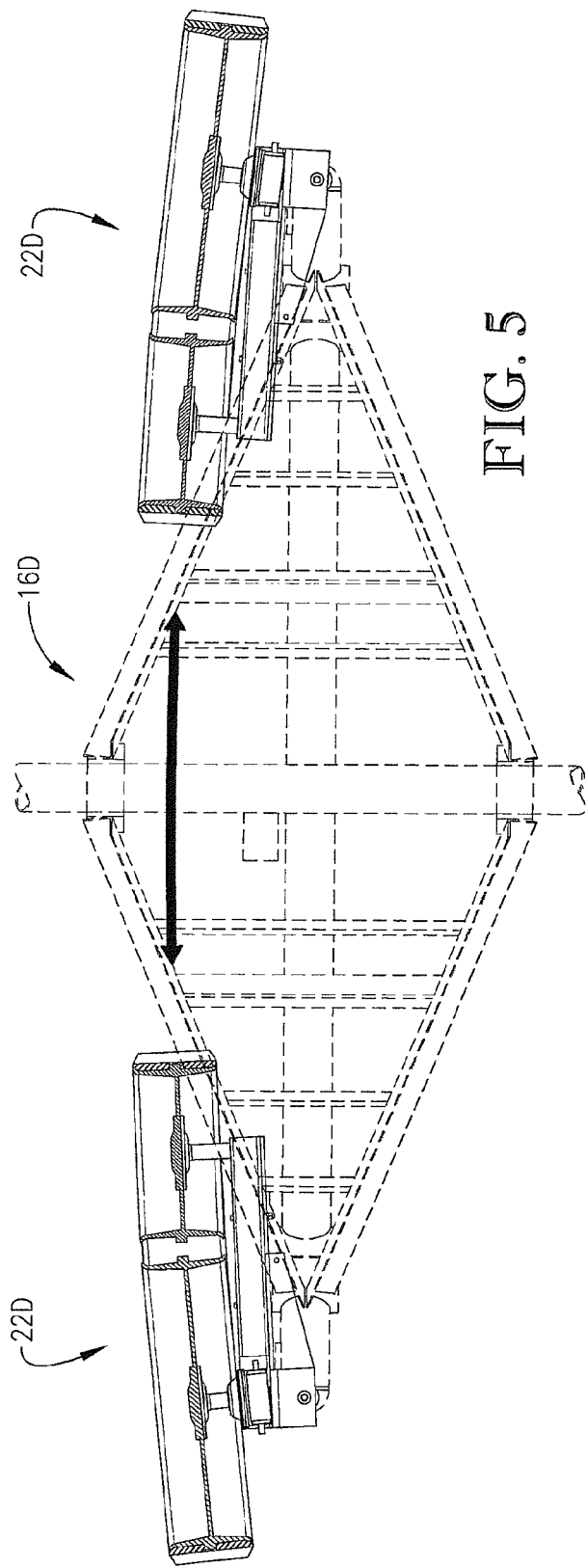
FIG. 5 is a top view in partial section of one of the mobile towers and its two track assemblies with the mobile tower shown in dashed lines.
Figure 6:
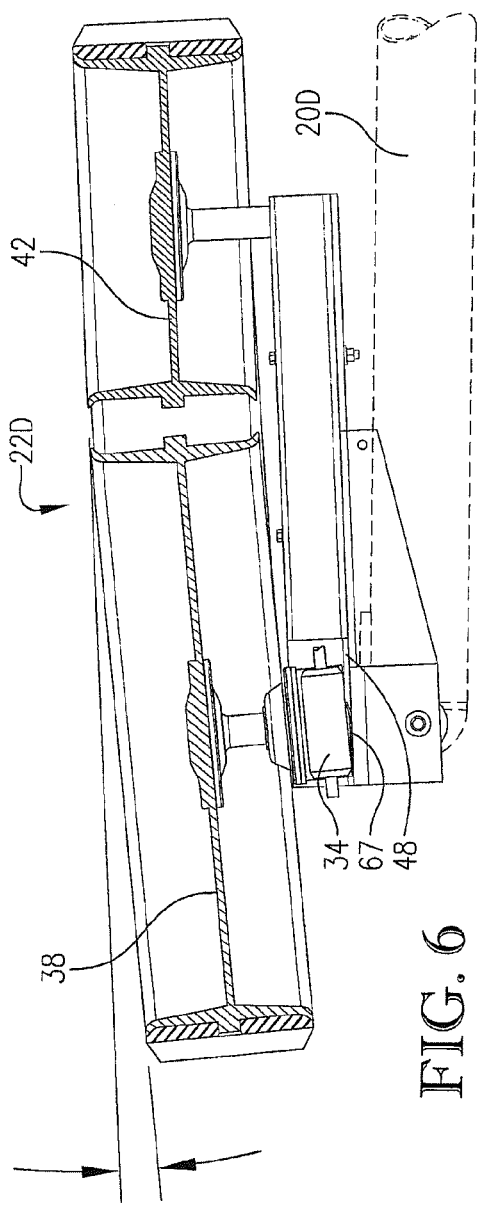
FIG. 6 is an enlarged top view in partial section of one of the track assemblies shown in FIG. 6.

The track assembly 22D may further include structure for adjusting a mounting angle of the gearbox 34 on the mounting bracket 48 to further adjust the turning radius or tow of the track assembly. In one embodiment, the structure includes a shim 67 or similar device for placement between the track assembly's gearbox 34 and mounting bracket 48 to adjust the drive wheel's tow or turning angle. This allows the tow of each track assembly to be selectively adjusted to accommodate its particular mobile tower. For example, the tow of all the track assemblies may be set with each track assembly's the hinge plate, mounting bracket, and turnbuckle described above. Then, the tow of selected ones of the track assemblies may be further adjusted with one or more of the shims 67 as shown in FIGS. 5 and 6.

An embodiment of the shim 67 is best shown in FIG. 4 and includes a generally planar main portion 69 and an angled leg 71. The main portion 69 includes a pair of slots 73 or holes for accommodating bolts or other fasteners that attach the gearbox assembly 34 to the mounting bracket 48. The leg 71 extends from the main portion 69 at an angle to space one end of the gearbox assembly 34 away from the mounting bracket 48. The length and/or angle of the leg 71 determines the angle of the gearbox assembly 34 relative to the mounting bracket 48 and thus the degree of tow of the track assembly. In one embodiment, the main portion of the shim is 8" long and 4" wide and the leg is 3" wide and extends from the main portion at an angle of 5° to provide the track assembly with approximately 3° of tow beyond that provided by the angular orientation of the mounting bracket on the hinge plate.

The mounting bracket 48 further includes a pair of spaced-apart, horizontally extending guide walls 68 that define an adjustment channel therebetween. A pair of slots 70 are formed in the vertical plate 60 between the guide walls, the purpose of which are described below.

The gearbox assembly 34 and drive wheel hub 36 are conventional and are attached to the mounting bracket 48 by bolts, screws, or other fasteners that extend through holes in the vertical plate of the bracket. The gearbox assembly 34 is then coupled to the drive shaft 20D of the motor 24D in a conventional manner.

The drive wheel 38 is attached to the drive wheel hub 36 by threaded lug nuts or other fasteners. In one embodiment, the drive wheel 38 is approximately 40" in diameter and 10" wide. A drive wheel of this size allows the track assembly to more closely match the wheel speed of a tire that has been replaced with the track assembly so that the gearbox 34 is not required to provide a significant RPM reduction for the track assembly as is required with prior art track assemblies.

The tension wheel hub 40 is rotatably mounted to a support tube 72 which is in turn positioned within the adjustment channel of the mounting bracket. The support tube 72 and tension wheel hub 40 may be shifted within the length of the adjustment channel to adjust the distance between the drive wheel 38 and the tension wheel 42 and fixed in place by a pair of bolts or other fasteners that extend through bolt holes in the support tube and the slots 70 between the guide walls in the mounting bracket.

The tension wheel 42 is attached to the tension wheel hub 40 by lug nuts or other fasteners. The tension wheel 42 guides, tensions, and supports the track belt 44. Importantly, no undercarriage is required. In one embodiment, the tension wheel 42 is approximately 24" in diameter and 10" wide.

The track belt 44 is trained over the drive wheel 38 and the tension wheel 42 and driven by the drive wheel. The track belt 44 may be made of rubber or any other suitable material and may include any tread pattern. An embodiment of the track belt is 175" long and 12" wide. The narrower width of the track belt, drive wheel, and tension wheel and the reduced length of the track belt, when compared to existing track assemblies for irrigation systems, reduces the footprint of the track assembly so it can be used with smaller irrigation systems without causing span buckling. Moreover, the reduced width creates less off-set loading on the gearbox output shaft.

To keep the track belt 44 centered on the drive wheel and the tension wheel, the drive wheel 38 and the tension wheel 42 each include a number of spaced-apart outwardly projecting pegs 74 and the track belt includes a number of spaced-apart holes 76 that receive the pegs.

Once the track assembly 22D is mounted to the mobile tower 16D as described above, the tension in the track belt 44 can be adjusted by loosening the bolts holding the support tube 72 within the adjustment channel of the mounting bracket 48. The tension wheel hub 42 may then be moved closer to the drive wheel hub 38 to reduce the tension on the track belt 44 or further from the drive wheel hub to increase the tension. In one embodiment, the tension wheel hub 42 and support tube 72 may be moved by placing a conventional tire jack between the drive wheel 38 and tension wheel 44 and adjusting it to achieve the desired tension on the track belt.

As should be apparent from the above description, the present invention provides an improved track assembly for irrigation systems that doesn't suffer from the problems of prior art irrigation system track assemblies. For example, the track assembly has better traction and flotation than wheel and tire assemblies but does not create the buckling and off-set loading problems of prior art irrigation system track assemblies. The track assembly of the present invention is also less complex and costly than known irrigation system track assemblies and is therefore practical for use with nearly any irrigation system.

The tow or steering angle of the track assembly may also be more easily adjusted to accommodate a non-linear path of travel for the irrigation system.

Although the invention has been described with reference to the embodiments illustrated in the attached drawing figures, it is noted that equivalents may be employed and substitutions made herein without departing from the scope of the invention as recited in the claims. For example, the principles of the present invention are not limited to the illustrated central pivot irrigation systems but may be implemented in any type of irrigation system including linear move irrigation systems.

Having thus described the preferred embodiment of the invention, what is claimed as new and desired to be protected by Letters Patent includes the following:

1. An irrigation system comprising:
   a central pivot;
   a series of mobile towers connected to the central pivot and to one another by support structure, each mobile tower having a drive tube, a drive motor, and a drive shaft driven by the drive motor; and
   at least one track assembly for supporting at least one of the mobile towers above a ground to be irrigated by the irrigation system, the track assembly comprising:
      a hinge plate for attachment to one end of the drive tube;
      a mounting bracket pivotally attached to the hinge plate;
      a gearbox assembly and rotatable drive wheel hub attached to the mounting bracket;
      a drive wheel attached to the drive wheel hub;
      a rotatable tension wheel hub attached to the mounting bracket and spaced from the drive wheel hub, the tension wheel hub being shiftable relative to the mounting bracket and the drive wheel hub;
      a tension wheel attached to the tension wheel hub;
      a track belt trained over the drive wheel and the tension wheel and driven by the drive wheel to propel the mobile tower;
      structure for adjusting a pivot angle of the mounting bracket with respect to the mobile tower to achieve a desired turning radius or tow for the track assembly; and
      structure for adjusting a mounting angle of the gearbox assembly on the mounting bracket to further adjust the turning radius or tow of the track assembly.

2. The irrigation system as set forth in claim 1, wherein the structure for adjusting the mounting angle of the gearbox assembly on the mounting bracket includes a shim configured to be placed between the gearbox assembly and the mounting bracket for towing the gearbox assembly relative to the mounting bracket.

3. The irrigation system as set forth in claim 2, wherein the shim includes a generally planar main portion and an angled leg, the angled leg extending from the generally planar main portion at an angle for towing the gearbox assembly relative to the mounting bracket.

4. The irrigation system as set forth in claim 3, wherein the angled leg and the generally planar main portion cooperatively define a leg angle and the angled leg is configured to tow the gearbox assembly relative to the mounting bracket at an angle correlated to the leg angle.

5. The irrigation system as set forth in claim 4, wherein the main portion is 8 inches long and 4 inches wide, the leg is 3 inches wide, and the leg angle is 5 degrees, the shim being configured to tow the gearbox assembly at approximately a 3 degree angle.

6. The irrigation system as set forth in claim 3, wherein the angled leg defines a leg length and the angled leg is configured to tow the gearbox assembly relative to the mounting bracket at an angle correlated to the leg length.

7. The irrigation system as set forth in claim 3, wherein the main portion defines at least one hole configured to receive a fastener therethrough.

8. The irrigation system as set forth in claim 1, wherein the structure for adjusting the pivot angle of the mounting bracket comprises an eye bolt, turnbuckle, or other adjustable fastener coupled between the mounting bracket and the mobile tower.

9. The irrigation system as set forth in claim 1, wherein the mounting bracket includes a pair of spaced-apart guide walls that define an adjustment channel, wherein the tension wheel hub is mounted to a support tube that can be moved along a length of the adjustment channel to tension the track belt.

10. The irrigation system as set forth in claim 1, wherein the drive wheel and the tension wheel are each 10 inches wide, and the track belt is 12 inches wide.

11. An irrigation system comprising:
    a central pivot;
    a series of mobile towers connected to the central pivot and to one another by support structure, each mobile tower having a drive tube, a drive motor, and a drive shaft driven by the drive motor; and
    at least one track assembly for supporting at least one of the mobile towers above a ground to be irrigated by the irrigation system, the track assembly comprising:
       a hinge plate for attachment to one end of the drive tube;
       a mounting bracket pivotally attached to the hinge plate and including a pair of spaced-apart guide walls that define an adjustment channel;
       a gearbox assembly and rotatable drive wheel hub attached to the mounting bracket;
       a drive wheel attached to the drive wheel hub;
       a rotatable tension wheel hub attached to the mounting bracket and spaced from the drive wheel hub;
       a tension wheel attached to the tension wheel hub;
       a track belt trained over the drive wheel and the tension wheel and driven by the drive wheel to propel the mobile tower;
       structure for adjusting a pivot angle of the mounting bracket with respect to the mobile tower to achieve a desired turning radius or tow for the track assembly; and
       structure including a shim configured to be placed between the gearbox assembly and the mounting bracket for adjusting a mounting angle of the gearbox assembly relative to the mounting bracket to further adjust the turning radius or tow of the track assembly,
       wherein the tension wheel hub is mounted to a support tube that can be moved along a length of the adjustment channel to tension the track belt.

* * * * *